US012723141B2

(12) United States Patent
Yu et al.

(10) Patent No.: US 12,723,141 B2
(45) Date of Patent: Sep. 1, 2026

(54) FOAMABLE POLYPROPYLENE COMPOSITION, AND FOAMED POLYPROPYLENE AND PREPARATION METHOD THEREFOR

(71) Applicants: CHINA ENERGY INVESTMENT CORPORATION LIMITED, Beijing (CN); NATIONAL INSTITUTE OF CLEAN-AND-LOW-CARBON ENERGY, Beijing (CN)

(72) Inventors: Fang Yu, Beijing (CN); WenBin Liang, Beijing (CN); Yi Ma, Beijing (CN); YinLing Zhang, Beijing (CN); ZhiCheng Zhang, Beijing (CN)

(73) Assignees: CHINA ENERGY INVESTMENT CORPORATION LIMITED, Beijing (CN); NATIONAL INSTITUTE OF CLEAN-AND-LOW-CARBON ENERGY, Beijing (CN)

( * ) Notice: Subject to any disclaimer, the term of this patent is extended or adjusted under 35 U.S.C. 154(b) by 1030 days.

(21) Appl. No.: 17/770,216

(22) PCT Filed: Apr. 9, 2020

(86) PCT No.: PCT/CN2020/083950

§ 371 (c)(1),
(2) Date: Apr. 19, 2022

(87) PCT Pub. No.: WO2021/077690

PCT Pub. Date: Apr. 29, 2021

(65) Prior Publication Data

US 2022/0396678 A1 Dec. 15, 2022

(30) Foreign Application Priority Data

Oct. 21, 2019 (CN) ........................ 201911002652.8

(51) Int. Cl.
*C08J 9/00* (2006.01)
*C08J 9/08* (2006.01)
(Continued)

(52) U.S. Cl.
CPC .......... *C08J 9/0061* (2013.01); *C08J 9/0066* (2013.01); *C08J 9/08* (2013.01); *C08J 9/103* (2013.01);
(Continued)

(58) Field of Classification Search
CPC . C08J 9/0061; C08J 9/0066; C08J 9/08; C08J 9/103; C08J 9/122; C08J 9/18;
(Continued)

(56) References Cited

U.S. PATENT DOCUMENTS 4,940,736 A 7/1990 Alteepping et al.
5,047,446 A 9/1991 Denicola, Jr. et al.
(Continued)

FOREIGN PATENT DOCUMENTS

CN 1845964 10/2006
CN 101125947 2/2008
(Continued)

OTHER PUBLICATIONS

Japanese Office Action (with English translation) for corresponding Application No. JP 2022- 523490, dated May 23, 2023, 10 pages.
(Continued)

*Primary Examiner* — K. Boyle
(74) *Attorney, Agent, or Firm* — Dority & Manning, PA

(57) ABSTRACT

A foamable polypropylene composition, and foamed polypropylene and a preparation method therefor are provided. The polypropylene composition comprises polypropylene, a polypropylene modifier, a foaming agent, and an optional nucleating agent. A preparation method for the polypropylene modifier comprises: enabling polar monomer grafted
(Continued)

polypropylene to be in contact with a component A to react and carrying out extruding pelletizing, wherein a polar monomer in the polar monomer grafted polypropylene can chemically react with the component A; the polar monomer is selected from at least one of dimethylamino methacrylate, epoxy acrylate, trimeric acrylic isocyanurate, and acrylamide; and the component A is selected from at least one of polyisocyanate, polyethylene oxide, and an amido-containing substance. The foamed polypropylene has an obtained foaming ratio of 12 times or more, and also has high tensile and flexural properties.

12 Claims, 2 Drawing Sheets

(51) Int. Cl.

| | |
|---|---|
| ***C08J 9/10*** | (2006.01) |
| ***C08J 9/12*** | (2006.01) |
| ***C08J 9/18*** | (2006.01) |
| ***C08J 9/232*** | (2006.01) |
| ***C08L 23/12*** | (2006.01) |

(52) U.S. Cl.

CPC ................ *C08J 9/122* (2013.01); *C08J 9/18* (2013.01); *C08J 9/232* (2013.01); *C08L 23/12* (2013.01); *C08J 2203/02* (2013.01); *C08J 2203/04* (2013.01); *C08J 2203/08* (2013.01); *C08J 2203/22* (2013.01); *C08J 2205/044* (2013.01); *C08J 2323/12* (2013.01); *C08J 2475/04* (2013.01); *C08L 2203/14* (2013.01); *C08L 2205/24* (2013.01)

(58) Field of Classification Search

CPC .... C08J 9/232; C08J 2203/02; C08J 2203/04; C08J 2203/08; C08J 2203/22; C08J 2205/044; C08J 2323/12; C08J 2475/04; C08J 2483/10; C08J 2487/00; C08J 2201/03; C08L 23/12; C08L 2203/14; C08L 2205/24; C08G 18/0895; C08G 18/633; C08G 18/73; C08G 18/7621; C08G 18/7671; C08F 8/30; C08F 8/32

See application file for complete search history.

(56) References Cited

U.S. PATENT DOCUMENTS

| | | | | |
|---|---|---|---|---|
| 5,414,027 | A | 5/1995 | Denicola, Jr. et al. | |
| 5,541,236 | A | 7/1996 | Denicola, Jr. et al. | |
| 2005/0159496 | A1 * | 7/2005 | Bambara | B32B 37/153 521/50 |
| 2012/0220730 | A1 | 8/2012 | Li et al. | |

FOREIGN PATENT DOCUMENTS

| | | | | |
|---|---|---|---|---|
| CN | 101225251 A | | 9/2008 | |
| CN | 102264523 | | 11/2011 | |
| CN | 102791782 | | 11/2012 | |
| CN | 103756124 | | 4/2014 | |
| CN | 104356305 | | 2/2015 | |
| CN | 104987588 | | 10/2015 | |
| CN | 105037952 | | 11/2015 | |
| CN | 105153546 | | 12/2015 | |
| CN | 105273314 | | 1/2016 | |
| CN | 105566751 | | 5/2016 | |
| CN | 107090166 A | | 8/2017 | |
| CN | 107129630 | | 9/2017 | |
| CN | 108285574 A | * | 7/2018 | C08F 8/32 |
| CN | 109265899 | | 1/2019 | |
| CN | 109749245 | | 5/2019 | |
| JP | H 08143743 A | | 6/1996 | |
| JP | 2005002228 | | 1/2005 | |
| JP | 2005002228 A | | 1/2005 | |
| JP | WO 2010073998 A1 | | 6/2012 | |
| JP | WO 2011111696 A1 | | 6/2013 | |
| JP | 2019044181 A | | 3/2019 | |
| JP | 2019099665 A | | 6/2019 | |
| WO | WO 2005/026255 A1 | | 3/2005 | |

OTHER PUBLICATIONS

Japanese Office Action (w/ English translation) for corresponding Application No. 2022-523490, dated Nov. 20, 2023, 7 pages.

PCT International Search Report (w/ English Translation) for corresponding Application No. PCT/CN2020/083950, mailed Jul. 21, 2020, 6 pages.

Office Action (w/ English Translation) for corresponding Application No. DE 11 2020 005 085.5, dated Oct. 28, 2022, 12 pages.

* cited by examiner

FOAMABLE POLYPROPYLENE COMPOSITION, AND FOAMED POLYPROPYLENE AND PREPARATION METHOD THEREFOR

CROSS REFERENCE TO RELATED APPLICATIONS

This application is a national stage of International Application No. PCT/CN2020/083950, filed on Apr. 9, 2020, which claims priority to Chinese Patent Application No. 201911002652.8, filed on Oct. 21, 2019, the contents of both of which are incorporated herein by reference in their entireties.

TECHNICAL FIELD

The present invention relates to the field of foamed plastics, and particularly, to a foamable polypropylene composition, and foamed polypropylene and a preparation method therefor.

BACKGROUND

Foam plastic has excellent properties, such as a light weight, a low thermal conductivity, heat insulation, sound insulation, and cushioning, and is widely used in daily use, packaging, transportation, construction and other fields. Polypropylene resin has a wide range of sources and a low price, and as a foaming material, the polypropylene resin has better properties, such as better rigidity, hardness, impact resistance, and temperature resistance, than traditional foaming materials, such as polystyrene and polyethylene. However, when ordinary polypropylene resin is used for foaming, a temperature range of machining is narrow, and it is difficult for foaming and forming. This is because polypropylene is a crystalline plastic, and the foaming can only be carried out close to a crystalline melting point, while a temperature difference from the melting point to foam pore rupture is small when the ordinary polypropylene resin foams. When ordinary polypropylene reaches the crystalline melting point, a viscosity of a melt of the ordinary polypropylene can be reduced rapidly, and a large amount of crystallization heat is released during crystallization, so that the viscosity of the melt and the strength of the melt are further reduced. Therefore, the melt of the ordinary polypropylene has a low strength and cannot wrap bubbles, so that it is easy to cause gas escape during foaming, leading to foam pore collapse and bubble merging, and incapability of producing an excellent foamed product.

In order to prepare a polypropylene foaming material with a high foaming ratio and even form pores, the properties of the polypropylene resin raw material should be improved first. The ways of improving the properties of the polypropylene comprise the use of high-melt-strength polypropylene, the partial cross-linking of the polypropylene, and the blending modification of the polypropylene.

CN105273314A discloses a polypropylene foaming thermal insulation material, wherein a physical blending method is used, atactic polypropylene and chlorinated polyethylene are used as matrix resins of a foaming material, a foaming property of PP is improved by adding an appropriate amount of chlorinated polyethylene, and an effect of toughening is exerted at the same time.

CN103756124A discloses a polypropylene foaming material, wherein an ethylene-acrylic acid copolymer is comprised in composition, and may be grafted with polypropylene under an action of peroxide to form a polypropylene long-chain branch, thus producing high-melt-strength polypropylene.

CN104356305A discloses a method for preparing high-melt-strength polypropylene based on solid phase grafting, wherein ingredients comprise 100 parts by weight of polypropylene, 0.01 to 1 part by weight of initiator, 0.1 to 5 parts by weight of multi-functional monomer, and 0.1 to 5 parts by weight of antioxidant; and specific steps comprise: adding the polypropylene, the multi-functional monomer, and the antioxidant into a high-speed mixer for even stirring, and setting a heating temperature of a container to be 90° C. to 120° C., and a rotating speed of the high-speed mixer to be 700 rpm to 1,400 rpm; then adding the initiator for stirring and reacting for 10 minutes to 60 minutes; and after reaction, putting the material into a cold mixer, adding 0 to 0.5 part by weight of antioxidant, subjecting the mixture to cold mixing for cooling, and then discharging to obtain the high-melt-strength polypropylene.

U.S. Pat. No. 5,047,446 discloses a method for manufacturing a high-molecular-weight and long-chain-branched polypropylene material from a polypropylene material with a solid linear-chain semi-crystal, wherein the method comprises a stage of irradiating the linear-chain polymer material by high-energy ion radiation and a stage of deactivating residual free groups in the irradiated polymer material by heating, which is characterized in that the improvement of the method comprises heating the irradiated polymer material between the deactivated residual free groups at a temperature of 40° C. to 110° C. for at least 10 minutes.

U.S. Pat. Nos. 5,414,027 and 5,541,236 disclose a generally solid, high-molecular-weight, nonlinear and essentially gel-free propylene polymer material, with a strain-hardening elongation viscosity and an enhanced melt strength. The high-melt-strength polypropylene is prepared by high-energy ion irradiation crosslinking.

Further, foaming methods of the polypropylene may usually be divided into a physical foaming method and a chemical foaming method. According to the physical foaming method, special metering, pressurizing and injecting systems of a foaming agent should be used, and the foaming agent is usually added at a corresponding position of an extruder where the polypropylene is completely melted. An ordinary extruder is used for the chemical foaming of the polypropylene. CN105566751A discloses a high-crystalline polypropylene resin foaming masterbatch and a preparation method thereof, wherein the chemical foaming method is used, PP and LDPE are used as matrix resins, a chemical foaming agent, a nucleating agent, a lubricant, a surfactant, and other additives are added into a high-speed mixer for even mixing, and then the mixture is added into a double-screw extruder for extruding pelletizing to obtain the high-crystalline polypropylene foaming masterbatch, which is used for injection foaming of polypropylene, and extrusion of foamed plate, foamed profile and foamed pipe.

In addition, Zote Company of the United Kingdom produced a micro-crosslinked thermoformed PP foam plastic. Alveo Company of Switzerland also produced a radiation-crosslinked PP/PE foam used in automobile industry.

In the prior art, a polypropylene melt modifier may usually be added to increase a foaming ratio of polypropylene, but a foamed polypropylene product has a poor mechanical property, which limits the application of the foamed plastic. Therefore, how to obtain the foamed polypropylene product with a high foaming ratio and a good mechanical property at the same time is an urgent problem to be solved in the art.

SUMMARY

The present invention aims to provide a foamable polypropylene composition, and foamed polypropylene and a preparation method therefor, and the foamable polypropylene composition can not only increase a foaming ratio of the prepared foamed polypropylene, but also enable the foamed polypropylene to have excellent mechanical properties, such as tensile and flexural properties.

According to a first aspect of the present invention, the present invention provides a foamable polypropylene composition, wherein the composition comprises polypropylene, a polypropylene modifier, a foaming agent, and an optional nucleating agent;

a preparation method for the polypropylene modifier comprises: enabling polar monomer grafted polypropylene in formula (1) or formula (2) to be in contact with a component A to react and carrying out extruding pelletizing, wherein the polar monomer in the polar monomer grafted polypropylene is capable of chemically reacting with the component A;

in formula (1), the polar monomer is at least one of maleic anhydride, acrylic acid, acrylate, methacrylic acid, methacrylate, vinyl neodecanoate, glycidyl methacrylate, dimethylamino methacrylate, epoxy acrylate, trimeric acrylic isocyanurate, and acrylamide; and the component A is selected from at least one of polyisocyanate and polyethylene oxide;

in formula (2), the polar monomer is selected from at least one of dimethylamino methacrylate, epoxy acrylate, trimeric acrylic isocyanurate, and acrylamide; and the component A is selected from at least one of polyisocyanate, polyethylene oxide, and an amine-containing substance, the amine-containing substance is selected from at least one of a compound I and a compound II, the compound I is an organic substance containing an amine group, an ether bond, and an aryl group, and the compound II is polyamine; and based on a total weight of the polar monomer grafted polypropylene and the component A in each formula, a dosage of the polar monomer grafted polypropylene ranges from 95 wt % to 99.8 wt %, and a dosage of the component A ranges from 0.2 wt % to 5 wt %.

According to a second aspect of the present invention, the present invention provides a preparation method for foamed polypropylene, comprising: carrying out a foam molding to the foamable polypropylene composition according to the first aspect of the present invention to obtain the foamed polypropylene.

According to a third aspect of the present invention, the present invention provides a foamed polypropylene prepared by the preparation method according to the second aspect of the present invention.

The polar monomer grafted polypropylene modified by the compound A is added into the foamable polypropylene composition of the present invention as the polypropylene modifier, so that the foamed polypropylene with a larger foaming ratio and a better mechanical property may be prepared. The foamed polypropylene has an obtained foaming ratio of 12 times or more, and the foamed polypropylene has high tensile and flexural properties at the same time.

Other features and advantages of the present invention will be described in detail in the following detailed description.

EMBODIMENT

Figure 1:
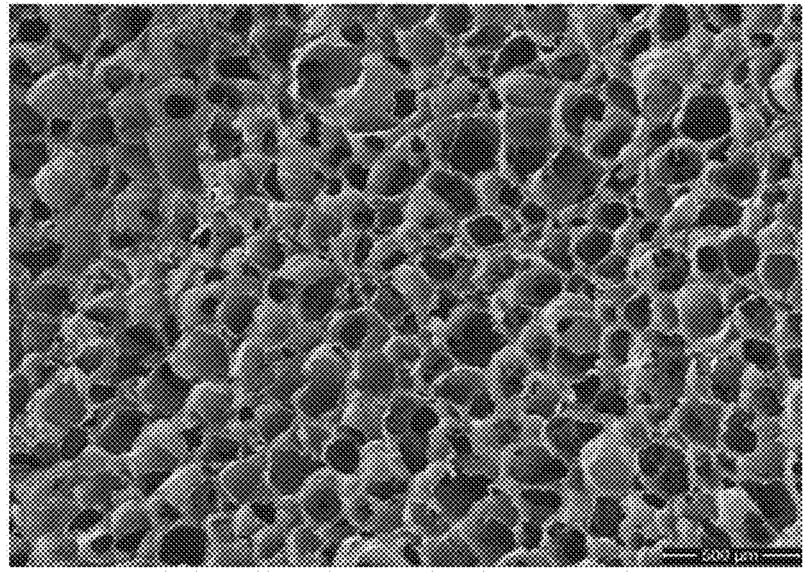
FIG. 1 to FIG. 3 are respectively foam scanning electron micrographs of the foamed polypropylene prepared in examples 1 to 3.

Endpoints of ranges and any values disclosed herein are not limited to the accurate ranges or values, and these ranges or values should be understood as comprising values close to these ranges or values. For numerical ranges, endpoint values of the ranges, the endpoint values of the ranges and individual point values, and the individual point values may be combined with each other to obtain one or more new numerical ranges, and these numerical ranges should be regarded as being specifically disclosed herein.

According to a first aspect of the present invention, the present invention provides a foamable polypropylene composition, wherein the composition comprises polypropylene, a polypropylene modifier, a foaming agent, and an optional nucleating agent.

In the present invention, a preparation method for the polypropylene modifier comprises: enabling polar monomer grafted polypropylene in formula (1) or formula (2) to be in contact with a component A to react and carrying out extruding pelletizing.

In the present invention, in formula (1), the polar monomer is at least one of maleic anhydride, acrylic acid, acrylate, methacrylic acid, methacrylate, vinyl neodecanoate, glycidyl methacrylate, dimethylamino methacrylate, epoxy acrylate, trimeric acrylic isocyanurate, and acrylamide; the component A is selected from at least one of polyisocyanate and polyethylene oxide; and the selected polar monomer is used in combination with the selected component A to react chemically during the reacting and extruding process.

In formula (1), the acrylate may specifically be selected from at least one of ethyl acrylate, butyl acrylate, and isooctyl acrylate. The methacrylate may specifically be selected from at least one of ethyl methacrylate, propyl methacrylate, butyl methacrylate, and hydroxyethyl methacrylate.

In the present invention, in formula (2), the polar monomer is selected from one or more of dimethylamino methacrylate, epoxy acrylate, trimeric acrylic isocyanurate, and acrylamide; the component A is selected from at least one of polyisocyanate, polyethylene oxide, and an amine-containing substance; and the selected polar monomer is used in combination with the selected component A to react chemically during the reacting and extruding process.

In the present invention, in the case that the component A is the amine-containing substance, the polar monomer is at least one of dimethylamino methacrylate, epoxy acrylate, trimeric acrylic isocyanurate, and acrylamide, the component A and the polar monomer cooperate with each other, the component A and the polar monomer may cooperate with each other, and formula (2) and formula (1) may both achieve the purpose of improving a melt strength of the polypropylene modifier and improving a mechanical property of the foamed polypropylene.

In the present invention, in the polypropylene modifier, based on a total weight of the polar monomer grafted polypropylene and the component A in each formula, a dosage of the polar monomer grafted polypropylene ranges from 95 wt % to 99.8 wt %, and preferably ranges from 97 wt % to 99.5 wt %; and a dosage of the component A ranges from 0.2 wt % to 5 wt %, and preferably ranges from 0.5 wt % to 3 wt %.

In the present invention, the polyisocyanate may be any polyisocyanate capable of chemically reacting with the polar monomer. Generally, the polyisocyanate is selected from one or more of diphenylmethane diisocyanate, 2,4-toluene diisocyanate, 2,6-toluene diisocyanate, p-phenylene diisocyanate, hexamethylene diisocyanate, and 4,4,4-triphenylmethane triisocyanate. The diphenylmethane diisocyanate is preferably 4,4-diphenylmethane diisocyanate.

In the present invention, a molecular weight of the polyethylene oxide ranges from $50\times10^4$ g/mol to $200\times10^4$ g/mol.

In the present invention, the amine-containing substance is selected from the compound I and/or the compound II. The compound I is an organic substance containing an amine group, an ether bond, and an aryl group, and the compound II is polyamine; and the compound I and the compound II are different.

According to a specific embodiment, the compound I is one or more of 4,4'-diaminodiphenyl ether, phenoxyaniline, 3,4'-diaminodiphenyl ether, and 3,3',4,4'-tetraaminodiphenyl ether, and is preferably phenoxyaniline and/or 3,3',4,4'-tetraaminodiphenyl ether.

In the present invention, the compound II is one or more of alkyl diamine, alkylene diamine, alkylene triamine, alkylene tetramine, alkylene pentamine, and aryl diamine, such as one or more of C2-12 alkyl diamine, C2-12 alkylene diamine, C2-C12 alkylene triamine, C2-C12 alkylene tetramine, C2-C12 alkylene pentamine, and C6-C18 aryl diamine.

According to a specific embodiment, the compound II is one or more of tetraethylene pentamine, triethylene diamine, diethylene triamine, triethylene tetramine, p-phenylenediamine, m-phenylenediamine, 1,9-diaminononane, and 1,12-diaminododecane; and is preferably diethylene triamine and/or 1,9-diaminononane.

In the present invention, the polar monomer grafted polypropylene (also known as poly(propylene-grafted-polar monomer)) may be obtained commercially, and may also be prepared by methods well known in the art, such as a solution grafting method, a melt grafting method, a solid-phase grafting method, and a radiation grafting method. According to one embodiment, the preparation of the polar monomer grafted polypropylene by the melt grafting method comprises: mixing the polar monomer (1% to 10%), the polypropylene (90% to 99%), and the initiator (0.1% to 3%) evenly, then adding the mixture into a double-screw extruder for melt extrusion at an extruding temperature of 160° C. to 230° C., a rotating speed of 100 r/min to 400 r/min, and a rotating speed for feeding of 5 Hz to 15 Hz, cooling a product through a basin and then pelletizing the product, and drying the product to obtain the polar monomer grafted polypropylene. The initiator may be selected from at least one of benzoyl peroxide, lauroyl peroxide, di(tert-butylperoxyisopropyl)benzene, tert-butyl peroxybenzoate, diisopropyl peroxydicarbonate, and 2,5-dimethyl-2,5-bis(tert-butyl peroxide)hexane.

According to one embodiment, a grafting ratio of the polar monomer grafted polypropylene ranges from 0.1 wt % to 3 wt %, and preferably ranges from 0.5 wt % to 2 wt %. A melt index (MI) of the polar monomer grafted polypropylene at 230° C. under 2.16 kg may range from 30 to 600 g/10 min, and preferably range from 45 to 350 g/10 min.

In the present invention, during the preparation of the polypropylene modifier, a reacting extruding may be carried out according to a conventional operation, and for the present invention, a preferred reacting extruding temperature ranges from 150° C. to 220° C. The extruder may have a rotating speed such as 50 r/min to 100 r/min, and a rotating speed for feeding such as 3 Hz to 8 Hz. The reacting extruding may be carried out in various double-screw extruders. After extruding pelletizing, the product may be dried at 80° C. to 95° C. for 30 minutes to 120 minutes.

In the present invention, for the foamable polypropylene composition, the polypropylene may be selected from homopolymerized polypropylene, block copolymerized polypropylene, and random copolymerized polypropylene obtained by various polymerization methods. Preferably, a melt index of the polypropylene at 230° C. under 2.16 kg ranges from 1 g/10 min to 10 g/10 min, and more preferably ranges from 2 g/10 min to 4 g/10 min. Molecular weight distribution of the polypropylene may range from 2 to 6. The polypropylene may obtained commercially.

The foaming agent in the foamable polypropylene composition is not particularly limited in the present invention, as long as the polypropylene may be foamed, which may specifically be a chemical foaming agent or a physical foaming agent. The chemical foaming agent is preferably selected from at least one of azodicarbonamide (foaming agent AC), sodium bicarbonate, citric acid, sodium carbonate, ammonium carbonate, and 4,4'-oxydibenzenesulfonyl hydrazide. The physical foaming agent is preferably selected from at least one of propane, butane, pentane, isopentane, hexane, isohexane, $N_2$, $CO_2$, $CH_4$, $H_2$, air, and freon, and is more preferably $CO_2$.

In the present invention, based on a total weight of the foamable polypropylene composition, a content of the polypropylene ranges from 75 wt % to 91 wt %, a content of the polypropylene modifier ranges from 5 wt % to 15 wt %, and a content of the foaming agent ranges from 4 wt % to 10 wt %.

In the present invention, preferably, the foamable polypropylene composition further comprises a nucleating agent. The nucleating agent may be selected from at least one of talcum powder, mica, calcium carbonate, calcium oxide, calcium carbonate, mica, kaolin, and silica. Based on the total weight of the foamable polypropylene composition, a content of the nucleating agent may range from 0 wt % to 3 wt %.

According to one embodiment, the foamable polypropylene composition may be obtained by carrying out extruding pelletizing on the polypropylene, the polypropylene modifier, the foaming agent, and the optional nucleating agent at 150° C. to 180° C. The obtained granular foamable polypropylene composition is used as a foamable polypropylene masterbatch, which is convenient for further preparation of the foamed polypropylene.

According to a second aspect of the present invention, the present invention provides a preparation method for foamed polypropylene, comprising: carrying out a foam molding to the foamable polypropylene composition according to the first aspect of the present invention to obtain the foamed polypropylene.

According to one embodiment, the foamed polypropylene is prepared by a compression foam molding technology, and the process of foam molding specifically comprises: carrying out a compression foam molding to the foamable polypropylene composition (which is namely the foamable polypropylene masterbatch) in a form of masterbatch, and then cooling the same. Components of the foamable polypropylene composition may be blended and pelletized at 150° C. to 180° C. first to obtain the foamable polypropylene masterbatch, and the foaming agent in the foamable polypropylene composition is a chemical foaming agent. In the embodiment, the compression foam molding is carried out at a temperature of 180° C. to 210° C. and a pressure of 0.1 MPa to 0.2 MPa, and the compression foam molding lasts for 5 minutes to 15 minutes. All the pressures involved in the present invention are gauge pressures. The cooling is performed at a temperature of 128° C. to 140° C. After the cooling, the mold is opened by releasing the pressure to obtain the foamed polypropylene.

According to another embodiment, the foamed polypropylene is prepared by an extruding foaming technology, and the process of foam molding specifically comprises: blending and foaming the components of the foamable polypropylene composition on an extruding foaming machine. The blending is carried out at a temperature of 150° C. to 210° C., and the foaming is carried out at a temperature of 150° C. to 180° C. The extruding foaming machine comprises a double-screw extruder and a single-screw extruder connected in series, wherein the foaming stage is carried out in the single-screw extruder. In this embodiment, the foamable polypropylene composition preferably contains the nucleating agent.

According to a third aspect of the present invention, the present invention provides a foamed polypropylene prepared by the preparation method above. The foamed polypropylene has a foaming ratio of 12 times or more. The foamed polypropylene has a tensile strength greater than 2.0 MPa, and a flexural modulus greater than 25 MPa. Generally, the foamed polypropylene has an average pore diameter less than or equal to 400 μm, and preferably, the average pore diameter is less than or equal to 200 μm, such as 50 μm, 100 μm, 150 μm and 200 μm.

The present invention will be further described in detail hereinafter with reference to the specific examples, but the present invention is not limited to these examples.

In the following examples and comparative examples:

(1) Main Raw Materials maleic anhydride grafted polyethylene with a brand number of P01020, purchased from ExxonMobil, with a grafting ratio of 1.2% and an MI of 348 g/10 min;

polyethylene oxide, with a molecular weight of one million g/mol, purchased from Aladdin Reagent Corporation;

polypropylene L5E89, which is ordinary linear polypropylene purchased from Baotou Coal Chemical Company of China Shenhua Coal to Liquid Chemical Co., Ltd.;

polypropylene WB140, which is high-melt-strength polypropylene purchased from Borealis; and PE100, with a brand number of 3490, purchased from *Borealis*.

(2) Characterization and Performance Test

Infrared spectroscopic analysis to the polypropylene modifier was carried out by Shimadzu IRPresidge-21 Fourier transform infrared spectrometer.

A foam structure of a foamed sample was observed by using a Scanning Electron Microscope (SEM): the foamed sample was immersed in liquid nitrogen and cooled for one hour, then taken out and subjected to fragile break quickly, and a surface cell morphology was observed by SEM after metal spraying on the fragile break section.

Tensile strength was tested according to ISO 527-1 and flexural strength was tested according to ISO 178/A.

All parts mentioned referred to parts by weight.

The following examples are used to illustrate the polypropylene composition and foamed polypropylene of the present invention and preparation methods thereof.

Example 1

(1) Preparation of Polypropylene Modifier 99 parts of acrylic acid grafted polypropylene (with a grafting ratio of 1.2%, and a MI of 52 g/10 min) were weighed, and fully mixed with 1 part of 2,4-toluene diisocyanate. The fully mixed raw materials were added into a HAAKE double-screw extruder, wherein an extruding temperature was set as 190° C., a rotating speed of the extruder was 50 r/min, and a rotating speed for feeding was 3 Hz. The raw materials were extruded and pelletized, and an obtained product was dried at 90° C. for 60 minutes to obtain the polypropylene modifier. The polypropylene modifier was prepared into samples for infrared analysis. In an infrared spectrogram, characteristic peaks of carbamate generated after reaction between —NCO and —OH appeared at 3350 $cm^{-1}$ and 1540 $cm^{-1}$. Characteristic peaks of —OH at 3400 $cm^{-1}$ to 3500 $cm^{-1}$ were decreased obviously, while a characteristic peak of an ester group —C═O at 1727 $cm^{-1}$ was increased obviously, which indicated that the acrylic acid reacted with isocyanate, and the prepared product was the target product.

(2) Preparation of Foamed Polypropylene 5 parts of polypropylene modifier, 90 parts of L5E89, and 5 parts of azodicarbonamide were weighed, fully mixed, and then added into a HAAKE double-screw extruder, wherein an extruding temperature was set as 180° C., a rotating speed of the extruder was 100 r/min, and a rotating speed for feeding was 7 Hz. The raw materials were extruded and pelletized, and an obtained product was dried at 90° C. for 30 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.2 MPa for 10 minutes, and then cooled to 130° C. to prepare the foamed polypropylene.

Properties of the foamed polypropylene are shown in Table 1, and a foam structure is shown in FIG. 1.

Example 2

A polypropylene modifier and a foamed polypropylene were prepared according to the methods in Example 1 except that, during preparation of the polypropylene modifier, 2,4-toluene diisocyanate was replaced by equal mass of hexamethylene diisocyanate, thus preparing the foamed polypropylene.

Figure 2:
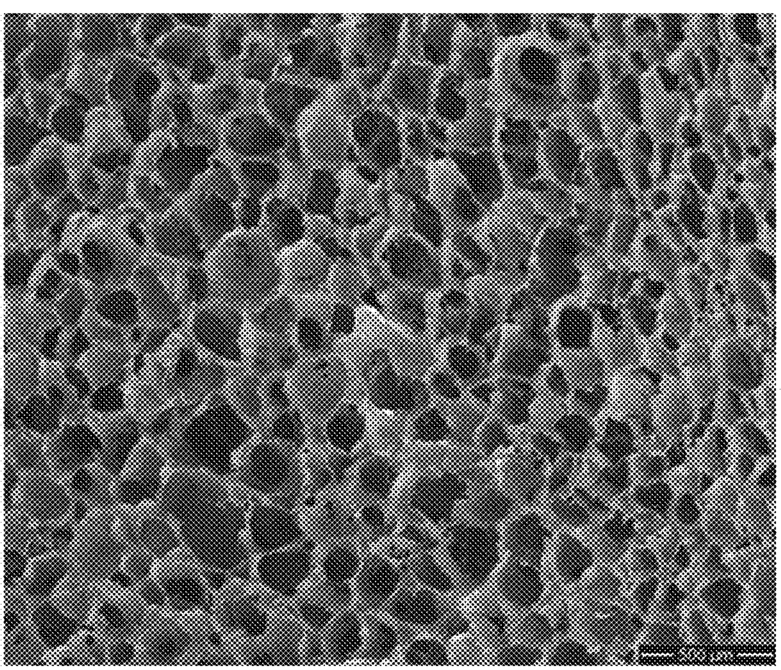

Properties of the foamed polypropylene are shown in Table 1, and a foam structure is shown in FIG. 2.

Example 3

A polypropylene modifier and a foamed polypropylene were prepared according to the methods in Example 1 except that, during preparation of the polypropylene modifier, the acrylic acid grafted polypropylene was replaced by equal mass of maleic anhydride grafted polyethylene, thus preparing the foamed polypropylene.

Figure 3:
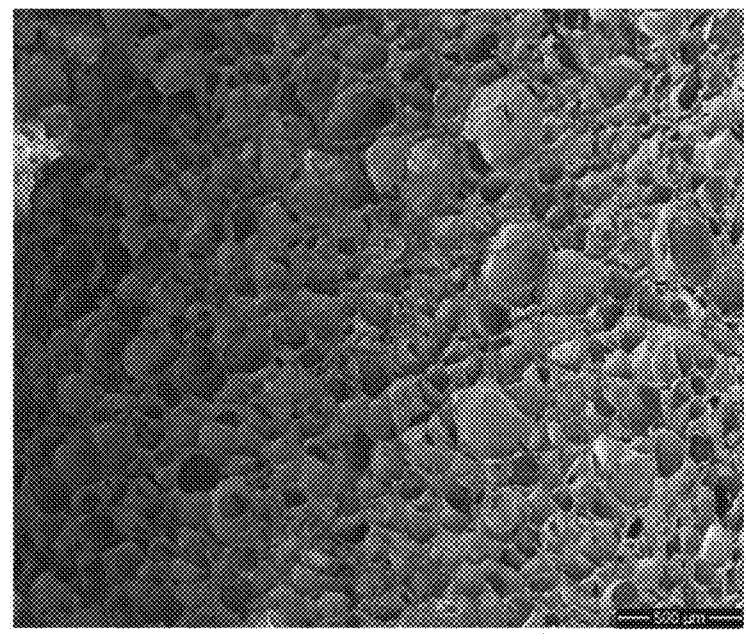

Properties of the foamed polypropylene are shown in Table 1, and a foam structure is shown in FIG. 3.

Comparative Example 1

5 parts of PE100, 90 parts of L5E89, and 5 parts of azodicarbonamide were weighed, fully mixed, and then added into a HAAKE double-screw extruder, wherein an extruding temperature was set as 180° C., a rotating speed of the extruder was 100 r/min, and a rotating speed for feeding was 7 Hz. The raw materials were extruded and pelletized, and an obtained product was dried at 90° C. for 30 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.2 MPa for 10 minutes, and then cooled to 130° C. to prepare the foamed polypropylene.

Properties of the foamed polypropylene are shown in Table 1.

Comparative Example 2

5 parts of WB140, 90 parts of L5E89, and 5 parts of azodicarbonamide were weighed, fully mixed, and then added into a HAAKE double-screw extruder, wherein an extruding temperature was set as 180° C., a rotating speed of the extruder was 100 r/min, and a rotating speed for feeding was 7 Hz. The raw materials were extruded and pelletized, and an obtained product was dried at 90° C. for 30 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.2 MPa for 10 minutes, and then cooled to 130° C. to prepare the foamed polypropylene.

Properties of the foamed polypropylene are shown in Table 1.

Comparative Example 3

92 parts of L5E89 and 8 parts of azodicarbonamide were weighed, fully mixed, and then added into a HAAKE double-screw extruder, wherein an extruding temperature was set as 160° C. A rotating speed of the extruder was 100 r/min, and a rotating speed for feeding was 5 Hz. The raw materials were extruded and pelletized, and an obtained product was dried at 90° C. for 60 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.2 MPa for 10 minutes, and then cooled to 130° C. to prepare the foamed polypropylene.

Properties of the foamed polypropylene are shown in Table 1.

Example 4

(1) Preparation of Polypropylene Modifier 99.4 parts of isooctyl acrylate grafted polypropylene (with a grafting ratio of 1.0%, and a MI of 89 g/10 min) were weighed, and fully mixed with 0.6 part of polyethylene oxide. The fully mixed raw materials were added into a HAAKE double-screw extruder, wherein an extruding temperature was set as 190° C., a rotating speed of the extruder was 50 r/min, and a rotating speed for feeding was 5 Hz. The raw materials were extruded and pelletized, and an obtained product was dried at 90° C. for 30 minutes to obtain the polypropylene modifier.

(2) Preparation of Foamed Polypropylene 10 parts of polypropylene modifier, 83 parts of L5E89, and 7 parts of sodium bicarbonate were weighed, fully mixed, and then added into a HAAKE double-screw extruder, wherein an extruding temperature was set as 170° C., a rotating speed of the extruder was 100 r/min, and a rotating speed for feeding was 7 Hz. The raw materials were extruded and pelletized, and an obtained product was dried at 90° C. for 60 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.1 MPa for 8 minutes, and then cooled to 135° C. to prepare the foamed polypropylene.

Properties of the foamed polypropylene are shown in Table 1.

Comparative Example 4

A polypropylene modifier and a foamed polypropylene were prepared according to the methods in Example 4 except that, during preparation of the polypropylene modifier, the polyethylene oxide was replaced by 4,4'-diaminodiphenyl ether and tetraethylene pentamine with a mass ratio of 1:1.

Properties of the foamed polypropylene prepared are shown in Table 1.

Example 5

(1) Preparation of Polypropylene Modifier 98 parts of acrylamide grafted polypropylene (with a grafting ratio of 2.0%, and a MI of 104 g/10 min, the same below) were weighed, and fully mixed with 2 parts of 4,4-diphenylmethane diisocyanate. The fully mixed raw materials were added into a HAAKE double-screw extruder, wherein an extruding temperature was set as 190° C., a rotating speed of the extruder was 50 r/min, and a rotating speed for feeding was 5 Hz. The raw materials were extruded and pelletized, and an obtained product was dried at 95° C. for 60 minutes to obtain the polypropylene modifier.

(2) Preparation of Foamed Polypropylene 15 parts of polypropylene modifier, 77 parts of L5E89, and 8 parts of azodicarbonamide were weighed, fully mixed, and then added into a HAAKE double-screw extruder, wherein an extruding temperature was set as 190° C., a rotating speed of the extruder was 100 r/min, and a rotating speed for feeding was 7 Hz. The raw materials were pelletized, and an obtained product was dried at 90° C. for 60 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 210° C. and pressurized at 0.2 MPa for 10 minutes, and then cooled to 140° C. to prepare the foamed polypropylene.

Properties of the foamed polypropylene are shown in Table 1.

Example 6

(1) Preparation of Polypropylene Modifier 98.8 parts of acrylamide grafted polypropylene were weighted and fully mixed with 1.2 parts of 4,4-diphenylmethane diisocyanate. The fully mixed raw materials were added into a HAAKE double-screw extruder, wherein an extruding temperature was set as 200° C., a rotating speed of the extruder was 100 r/min, and a rotating speed for feeding was 5 Hz. The raw materials were extruded and pelletized, and an obtained product was dried at 90° C. for 30 minutes to obtain the polypropylene modifier.

(2) Preparation of Foamed Polypropylene 5 parts of polypropylene modifier, 90 parts of L5E89, 4 parts of azodicarbonamide and 1 part of silica were weighed and fully mixed, then added into a HAAKE double-screw extruder for blending and extruding, wherein an extruding temperature was set as 170° C. A rotating speed of the extruder was 150 r/min, and a rotating speed for feeding was 8 Hz. Then, extruding foaming was carried out, and a foaming temperature of a single-screw extruding foaming machine connected in series with the double-screw extruder was set at 170° C., and foamed polypropylene was obtained by extruding.

Properties of the foamed polypropylene are shown in Table 1.

Example 7

(1) Preparation of Polypropylene Modifier 99 parts of trimeric acrylic isocyanurate grafted polypropylene (with a grafting ratio of 1.6%, and a MI of 78 g/10 min, the same below) were weighed, and fully mixed with 1 part of phenoxyaniline. The fully mixed raw materials were added into a HAAKE double-screw extruder, wherein an extruding temperature was set as 200° C., a rotating speed of the extruder was 70 r/min, and a rotating speed for feeding was 3 Hz. The raw materials were extruded and pelletized, and an obtained product was dried at 90° C. for 70 minutes to obtain the polypropylene modifier.

(2) Preparation of Foamed Polypropylene 5 parts of polypropylene modifier, 90 parts of L5E89, and 5 parts of azodicarbonamide were weighed, fully mixed, and then added into a HAAKE double-screw extruder, wherein an extruding temperature was set as 180° C., a rotating speed of the extruder was 100 r/min, and a rotating speed for feeding was 7 Hz. The raw materials were extruded and pelletized, and an obtained product was dried at 90° C. for 30 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.2 MPa for 10 minutes, and then cooled to 135° C. to prepare the foamed polypropylene.

Properties of the foamed polypropylene are shown in Table 1.

Comparative Example 5

A polypropylene modifier and a foamed polypropylene were prepared according to the methods in Example 7 except that, during preparation of the polypropylene modifier, the trimeric acrylic isocyanurate was replaced by equal mass of maleic anhydride grafted polyethylene.

Properties of the foamed polypropylene prepared are shown in Table 1.

Comparative Example 6

(1) Preparation of Polypropylene Modifier 99 parts of maleic anhydride grafted polyethylene were weighted and fully mixed with 0.5 part of phenoxyaniline and 0.5 part of p-phenylenediamine. The fully mixed raw materials were added into a HAAKE double-screw extruder, wherein an extruding temperature was set as 200° C., a rotating speed of the extruder was 10 r/min, and a rotating speed for feeding was 7 Hz. The raw materials were extruded and pelletized, and an obtained product was dried at 90° C. for 70 minutes to obtain foamable polypropylene masterbatches.

(2) Preparation of Foamed Polypropylene

Same as Example 7.

Properties of the foamed polypropylene prepared are shown in Table 1.

Example 8

(1) Preparation of Polypropylene Modifier 98.3 parts of epoxy acrylate grafted polypropylene (with a grafting ratio of 1.4%, and a MI of 159 g/10 min) were weighed, and fully mixed with 1.7 parts of 1,9-diaminononane. The fully mixed raw materials were added into a HAAKE double-screw extruder, wherein an extruding temperature was set as 200° C., a rotating speed of the extruder was 100 r/min, and a rotating speed for feeding was 5 Hz. The raw materials were extruded and pelletized, and an obtained product was dried at 90° C. for 30 minutes to obtain the polypropylene modifier.

(2) Preparation of Foamed Polypropylene 5 parts of polypropylene modifier, 90 parts of L5E89, and 5 parts of sodium bicarbonate were weighed, fully mixed, and then added into a HAAKE double-screw extruder, wherein an extruding temperature was set as 180° C., a rotating speed of the extruder was 100 r/min, and a rotating speed for feeding was 7 Hz. The raw materials were extruded and pelletized, and an obtained product was dried at 90° C. for 30 minutes to obtain foamable polypropylene masterbatches.

20 g of foamable polypropylene masterbatches were weighed and placed in a mold with a width of 10 cm, a length of 12 cm and a height of 1 mm, then the mold was placed on a lower pressing platform of a tablet press, and a pressing plate was closed. The mold was heated at 200° C. and pressurized at 0.2 MPa for 10 minutes, and then cooled to 135° C. to prepare the foamed polypropylene.

Properties of the foamed polypropylene are shown in Table 1.

Example 9

(1) Preparation of Polypropylene Modifier 97.2 parts of dimethylamino methacrylate grafted polypropylene (with a grafting ratio of 1.8%, and a MI of 76 g/10 min) were weighed, and fully mixed with 2.8 parts of diethylenetriamine. The fully mixed raw materials were added into a HAAKE double-screw extruder, wherein an extruding temperature was set as 200° C., a rotating speed of the extruder was 50 r/min, and a rotating speed for feeding was 3 Hz. The raw materials were extruded and pelletized, and an obtained product was dried at 90° C. for 120 minutes to obtain the polypropylene modifier.

(2) Preparation of Polypropylene Material 5 parts of polypropylene modifier, 86 parts of L5E89 and 1 part of silica were weighed and fully mixed, then added into a double-screw extruder for blending and extruding. Meanwhile, 3 parts of supercritical $CO_2$ were injected from a supercritical $CO_2$ injection system, wherein an extruding temperature was set at 180° C. A rotating speed of the extruder was 150 r/min, and a rotating speed for feeding was 8 Hz. Then, extruding foaming was carried out, and a foaming temperature of a single screw extruding foaming machine connected in series with the double-screw extruder was set at 160° C., and foamed polypropylene was obtained by extruding.

Properties of the foamed polypropylene are shown in Table 1.

Comparative Example 7

A polypropylene modifier and a foamed polypropylene were prepared according to the methods in Example 9 except that, during preparation of the polypropylene modifier, the dimethylamino methacrylate grafted polypropylene was replaced by equal mass of methacrylic acid grafted polyethylene (with a grafting ratio of 1.5%, and a MI of 94 g/10 min).

Properties of the foamed polypropylene prepared are shown in Table 1.

Example 10

(1) Preparation of Polypropylene Modifier 99.2 parts of acrylamide grafted polypropylene were weighted and fully mixed with 0.8 part of polyethylene oxide. The fully mixed raw materials were added into a HAAKE double-screw extruder, wherein an extruding temperature was set as 200° C. a rotating speed of the extruder was 50 r/min, and a rotating speed for feeding was 3 Hz. The raw materials were extruded and pelletized, and an obtained product was dried at 90° C. for 120 minutes to obtain the polypropylene modifier.

(2) Preparation of Foamed Polypropylene

Same as Example 8. Properties of the foamed polypropylene prepared are shown in Table 1.

Example 11

A polypropylene modifier and a foamed polypropylene were prepared according to the methods in Example 10 except that, during preparation of the polypropylene modifier, the acrylamide grafted polypropylene was replaced by trimeric acrylic isocyanurate grafted polypropylene.

Properties of the foamed polypropylene prepared are shown in Table 1.

TABLE 1

| Serial number | Foaming ratio (times) | Foam average pore diameter (μm) | Tensile strength (MPa) | Flexural modulus (MPa) |
|---|---|---|---|---|
| Example 1 | 14 | 124 | 3.47 | 32.1 |
| Example 2 | 13 | 118 | 3.98 | 35.9 |
| Example 3 | 15 | 106 | 2.99 | 29.7 |
| Comparative Example 1 | 6 | 498 | 4.3 | 86.2 |
| Comparative Example 2 | 7 | 475 | 4.1 | 80.1 |
| Comparative Example 3 | 3 | 580 | 4.8 | 93.5 |

TABLE 1-continued

| Serial number | Foaming ratio (times) | Foam average pore diameter (μm) | Tensile strength (MPa) | Flexural modulus (MPa) |
|---|---|---|---|---|
| Example 4 | 12 | 131 | 3.89 | 34.9 |
| Comparative Example 4 | 13 | 352 | 1.32 | 21.5 |
| Example 5 | 13 | 122 | 3.81 | 34.8 |
| Example 6 | 14 | 138 | 3.12 | 30.5 |
| Example 7 | 12 | 129 | 4.02 | 36.1 |
| Comparative Example 5 | 6 | 548 | 4.03 | 79.1 |
| Comparative Example 6 | 13 | 415 | 1.14 | 19.7 |
| Example 8 | 12 | 141 | 3.95 | 35.8 |
| Example 9 | 14 | 112 | 3.68 | 33.4 |
| Comparative Example 7 | 5 | 562 | 4.07 | 78.6 |
| Example 10 | 15 | 120 | 2.89 | 29.8 |
| Example 11 | 14 | 139 | 3.15 | 31.1 |

It can be seen from the results in Table 1 that the foamed polypropylene prepared by the foamable polypropylene composition of the present invention can not only have a higher foaming ratio, but also have better tensile and flexural properties. The foam average pore diameter of the foamed polypropylene material prepared is small, which is no more than 200 μm. With reference to FIG. 1 to FIG. 3, it can also be observed that the foamed polypropylene prepared by the foamable polypropylene composition of the present invention has fine and uniform pores and good foaming effect.

In Comparative Examples 1 and 2, the polypropylene modifier is not used, while polypropylene is mixed with polyethylene (PE100) or commercial high melt strength polypropylene (WB140) respectively, and then the foaming agent is added to prepare the foaming products. In Comparative Example 3, only the polypropylene and the foaming agent are used to prepare the foamed polypropylene. The foaming ratios of the foamed products obtained in Comparative Examples 1 to 3 are very low, which can only reach 3 to 7 times.

Although the foamed polypropylene prepared in Comparative Example 6 has a higher foaming ratio, which can reach more than 10 times, the tensile strength and flexural modulus are low, and the mechanical properties are worse than that of the foamed material prepared according to the present invention.

Those described above are merely preferred embodiments of the present invention, but the present invention is not limited to these. Within the scope of the technical concept of the present invention, many simple modifications can be made to the technical solutions of the present invention, comprising the combination of various technical features in any other suitable way. These simple modifications and combinations shall also be regarded as the contents disclosed by the present invention and belong to the protection scope of the present invention.

The invention claimed is:

1. A foamable polypropylene composition, wherein the composition comprises polypropylene, a polypropylene modifier, a foaming agent, and an optional nucleating agent;

a preparation method for the polypropylene modifier comprises: enabling polar monomer in formula (1) or formula (2) to be grafted with a polypropylene to obtain a polar monomer grafted polypropylene, allowing the polar monomer grafted polypropylene to be in contact with a component A to react and carrying out extruding pelletizing, wherein the polar monomer in the polar monomer grafted polypropylene is capable of chemically reacting with the component A;

wherein the formula (1) comprises the following components: the polar monomer in formula (1) and the component A, wherein the polar monomer in formula (1) is at least one of maleic anhydride, acrylic acid, acrylate, methacrylic acid, methacrylate, vinyl neodecanoate, glycidyl methacrylate, dimethylamino methacrylate, epoxy acrylate, trimeric acrylic isocyanurate, and acrylamide; and the component A is selected from at least one of polyisocyanate and polyethylene oxide;

wherein the formula (2) comprises the following components: the polar monomer in formula (2) and the component A, wherein the polar monomer in formula (2) is selected from at least one of dimethylamino methacrylate, epoxy acrylate, trimeric acrylic isocyanurate, and acrylamide; and the component A is selected from at least one of polyisocyanate and polyethylene oxide; and based on a total weight of the polar monomer grafted polypropylene and the component A in each formula, a dosage of the polar monomer grafted polypropylene ranges from 95 wt % to 99.8 wt %, and a dosage of the component A ranges from 0.2 wt % to 5 wt %.

2. The foamable polypropylene composition according to claim 1, wherein based on a total weight of the foamable polypropylene composition, a content of the polypropylene ranges from 75 wt % to 91 wt %, a content of the polypropylene modifier ranges from 5 wt % to 15 wt %, and a content of the foaming agent ranges from 4 wt % to 10 wt %.

3. The foamable polypropylene composition according to claim 1, wherein the polyisocyanate is selected from one or more of diphenylmethane diisocyanate, 2,4-toluene diisocyanate, 2,6-toluene diisocyanate, p-phenylene diisocyanate, hexamethylene diisocyanate, and 4,4,4-triphenylmethane triisocyanate.

4. The foamable polypropylene composition according to claim 1, wherein a grafting ratio of the polar monomer grafted polypropylene ranges from 0.1 wt % to 3 wt %.

5. The foamable polypropylene composition according to claim 1, wherein the foaming agent is selected from at least one of azodicarbonamide, sodium bicarbonate, citric acid, sodium carbonate, ammonium carbonate, and 4,4'-oxydibenzenesulfonyl hydrazide.

6. The foamable polypropylene composition according to claim 1, wherein the foaming agent is selected from at least one of propane, butane, pentane, isopentane, hexane, isohexane, $N_2$, $CO_2$, $CH_4$, $H_2$, air, and freon.

7. The foamable polypropylene composition according to claim 1, wherein the foamable polypropylene composition is obtained by carrying out extruding and pelletizing on the polypropylene, the polypropylene modifier, the foaming agent, and the optional nucleating agent at 150° C. to 180° C.

8. A preparation method for foamed polypropylene, comprising: carrying out a foam molding to the foamable polypropylene composition according to claim 1 to obtain the foamed polypropylene.

9. The preparation method according to claim 8, wherein the process of foam molding comprises: carrying out a compression foam molding to the foamable polypropylene composition in a form of masterbatch; and the compression foam molding is carried out at a temperature of 180° C. to 210° C. and a pressure of 0.1 MPa to 0.2 MPa, and the compression foam molding lasts for 5 minutes to 15 minutes.

10. The preparation method according to claim 8, wherein the process of foam molding comprises: blending and foaming the components of the foamable polypropylene composition on an extruding foaming machine; and the blending is carried out at a temperature of 150° C. to 210° C., and the foaming is carried out at a temperature of 160° C. to 180° C.

11. A foamed polypropylene prepared by the preparation method according to claim 8.

12. The foamed polypropylene according to claim 11, wherein the foamed polypropylene has a foaming ratio of 12 times or more, a tensile strength greater than 2.0 MPa, and a flexural modulus greater than 25 MPa.

* * * * *